United States Patent Office 3,715,409
Patented Feb. 6, 1973

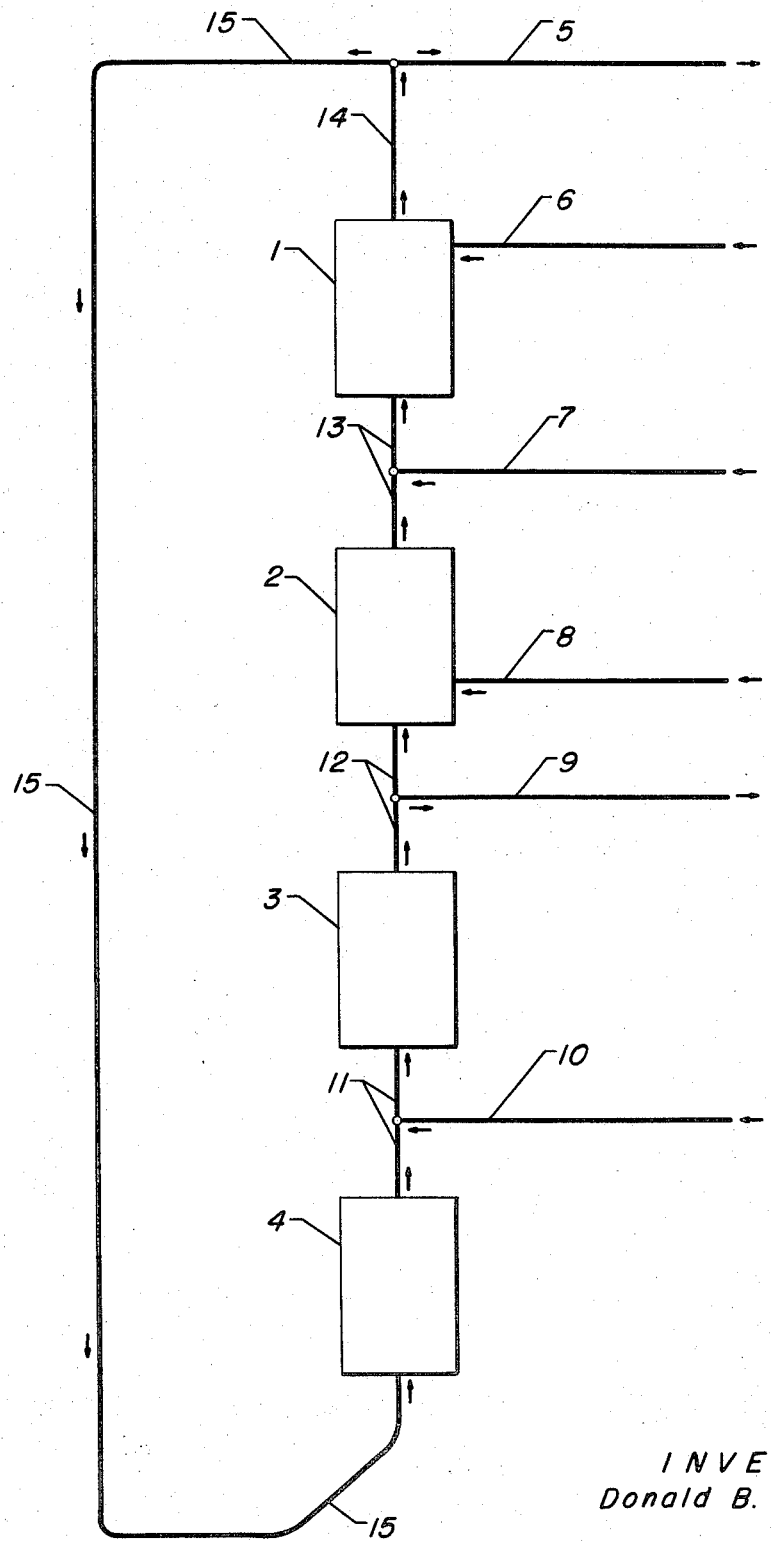

3,715,409
HYDROCARBON SEPARATION
Donald B. Broughton, Evanston, Ill., assignor to Universal Oil Products Company, Des Plaines, Ill.
Filed Mar. 8, 1971, Ser. No. 122,072
Int. Cl. C07c 7/12
U.S. Cl. 260—674 SA                        16 Claims

ABSTRACT OF THE DISCLOSURE

An improved process for the separation of hydrocarbons from a feed stock which process comprises the adsorption of a selected feed component followed by the desorption of a selected feed component from a solid adsorbent through the use of a desorbent material. The adsorption is performed in adsorption zone while the desorption is performed in a desorption zone. The adsorption zone and desorption zones are separated by a purification zone in which the adsorbed component of the feed stock is effectively purified and allowed to become more concentrated on the adsorbent as it enters the desorption zone. The improvement of the process comprises the use of a buffer zone which is represented by a quantity of adsorbent material located between an adsorption zone and a desorption zone and which allows raffinate material which normally would be withdrawn from an adsorption zone to be partially diverted and passed into the buffer zone to displace desorbent material in that zone which displaced desorbent material passes into a desorption zone. The improvement allows the prevent of contamination of the extract product by raffinate components and also allows the more efficient use of desorbent by reducing the absolute quantity of desorbent needed for a given separation at given feed rates.

BACKGROUND OF THE INVENTION

Field of the invention

The field of art to which this invention pertains can broadly be categorized as hydrocarbon separation. More specifically, this invention relates to a process for separating a hydrocarbon feed stock which utilizes a fixed bed adsorbent with simulated moving bed flow scheme in which the solid and fluid materials contacting the solid pass in a countercurrent contacting procedure to allow the selective adsorption zone and separation of a given component of the feed stock.

Description of the prior art

Specific patents which are considered closely related to the present invention are U.S. Pat. No. 2,646,451 having as its inventor R. H. Rommel (Cl. 260—674), U.S. Pat. No. 2,985,589 having as its inventors D. B. Broughton and C. G. Gerhold (Cl. 210—34), and U.S. Pat. No. 3,274,099 having as its inventor D. B. Broughton (Cl. 208–310). All of the aforementioned patents relate to countercurrent solid-fluid separation processes in which a selected component of a feed stock is separated into a product stream containing a more concentrated quantity of that material.

The first patent discloses a basic adsorption-desorption operation involving a moving bed of silica gel to effect a countercurrent solid and fluid contacting process. The process utilizes the recycling of a raffinate material to a second desorption zone to effect the removal of desorbent material from solid adsorbent which is passing into an adsorption zone. There is also utilized a recycling of an extract material to a portion of an aromatic encriching zone to aid in the purification of the adsorbed component of the feedstock.

The adsorbent which passes out of the primary desorption zone passes directly into an adsorption zone, to effect the continuous adsorption-desorption operation using the same adsorbent in repeated cycles.

The second patent discloses the basic concept of a simulated moving bed countercurrent solid-fluid contacting process employing a fixed bed of a solid adsorbent and having moving input and output streams which allow a segregation of zones in which separate functions are taking place in order to separate a feed stock into a raffinate product component and an extract product component. This patent is thought to disclose the basic processing scheme from which most countercurrent fixed bed processes are derived.

The third patent discloses the same basic processing steps as was seen in the first patent but includes an additional input stream in a rectification zone which is located between an adsoprtion zone and a desorption zone. The additional input stream utilizes a sweeping agent which is passed into the process to push raffinate material which is trapped between the interstitial void spaces between adsorbent particles back into an adsorption zone in order to prevent raffinate material from passing from the adsorption zone into a desorption zone with the effect of contamination of an extract material with raffinate material. The sweeping agent used in the third patent is easily separable from the feed stock by distillation means.

The present improved process employs a fluid-solid countercurrent contacting process in which a fixed bed of adsorbent is utilized and in which a quantity of adsorbent is maintained between a desorption zone and an adsorption zone to effectively reduce the contamination of an extract output stream by raffinite material passing into the desorption zone. Additionally, the quantity of desorbent material needed to desorb extract material from the adsorbent in the desorption zone is reduced by displacing desorbent from the buffer zone into the desorption zone by raffinate material which is passed into the buffer zone. The improvement disclosed herein is not taught or suggested by any of the above references.

In the Rommel reference, the silica gel which is removed from the bottom of the column as shown in FIG. 1 of that patent is passed into the top of what is referred to as a second desorption zone. The silica gel which is removed from the bottom of the column carries residual desorbent agent in the adsorbed phase. The silica gel continuously withdrawn from the bottom of the column and passes directly into the top of the column as indicated by dotted line 12 in FIG. 1 of that patent. In carrying the adsorbent together with adsorbed desorbent there is no indication or reference that raffinate material may countercurrently contact the silica gel and pass into the bottom of the desorbent zone. If there were an indication that this step could be accomplished, which step is part of the process of the present invention, then there would be a substantial contamination of the extract stream by raffinate materials.

SUMMARY

It is an object of the present invention to present a process in which improved operating results can be obtained through the use of a countercurrent flow of a stream containing raffinate material from an adsorption zone into a buffer zone with the consequential displacement of desorbent material present in the buffer zone and the passage of that desorbent material back into a desorption zone. The benefits achieved by using the process of this invention are: (1) a reduced need of desorbent material in the process for a given feed rate passed into the process, and (2) the prevention of contamination of an extract product material with raffinate material.

In order to gain a more full understanding of the process of this invention the following definitions are given.

The term "feed input stream" indicates a stream in the process through which feed material passes into an adsorption zone. The term "desorbent input stream" indicates a stream in the process through which desorbent material passes into the desorption zone. The term "raffinate output stream" or the term "raffinate stream" shall signify a stream through which the less selectively adsorbed raffinate material is removed from the process. The term "raffinate material input stream" signifies a stream passing into the process which is derived from a raffinate output stream. The raffinate material input stream contains essentially pure raffinate material. The term "extract output stream" or "extract stream" signifies a stream through which extract material is withdrawn from the desorption zone. The term "extract material input stream" signifies a stream containing essentially pure extract material which stream is derived from an extract output stream.

Feed streams which can be used in the process of this invention contain at least two components selected from the diethylbenzenes or xylenes including ethylbenzene with the possible inclusion of a portion of straight and branched chain paraffins, cyclo paraffins and aromatics including benzene, toluene, naphthalenes. Other aromatics may be used as feed stocks including various isomers of the $C_9$, $C_{10}$, $C_{11}$ and $C_{12}$ aromatic hydrocarbons. It is preferred that the aromatic concentration of a feed stock vary from about 30 to about 100 vol. percent of the feed stream.

Desorbents which can be used in the process of this invention should be easily separated from the feed mixture by fractionation or other physical separation operations. In desorbing the preferentially adsorbed component or components of the feed from the adsorbent, both desorbent and the desorbed feed component are removed from the adsorbent bed in admixture, and without a method of separation of these two materials the purity of the selectively adsorbed component of the feed stock would not be very high. Therefore, it is contemplated that a desorbent of a different boiling range than the feed mixture be used in this process. The use of a desorbent of a different boiling range will allow fractionation or other separation methods to be used to separate the selectively adsorbed feed components into a relatively pure product stream and allow recovery of the desorbent for possible reuse in this process. Specific desorbents which can be used in the process of this invention include benzene, toluene, ethers, alcohols, chlorinated cyclic compounds, cyclic dienes and the ketones. Xylenes can be used as desorbents for diethylbenzene feed stock while diethylbenzene materials can be used as desorbents for xylene feed stocks.

Adsorption conditions, desorption conditions and purification conditions can include both liquid phase and vapor phase operations. Liquid phase operations are slightly preferred because of the lower temperature requirements and slightly improved selectivity associated with the lower temperatures. Temperature ranges for the above conditions can include the range of from about 40° C. to about 270° C. The pressures preferred in the operation of this process include the range of from about atmospheric to about 500 p.s.i.g. Higher pressures may be utilized but the benefits derived from the higher pressures do not offset the relatively high unit costs for processes operating at the higher pressures.

The term "selective pore volume" of the adsorbent is defined as the volume of the adsorbent which selectively adsorbs extract components from the feed stock. The term "non-selective void volume" of the adsorbent includes the cavities of the adsorbent which contain no adsorptive sites and the interstitial void spaces between the adsorbent particles. The selective pore volume and the non-selective void volume are generally expressed in volumetric quantities and are of importance in determining the proper flow rates of fluid required to be passed into and out of operating zones for efficient operations to take place.

When adsorbent passes into an operational zone its non-selective void volume together with its selective pore volume carries fluid into that zone. The non-selective void volume is utilized in determining the amount of fluid which should pass into the same zone in a countercurrent direction to the adsorbent to displace the fluid present in the non-selective void volume of the adsorbent. If the fluid flow rate passing into a zone is smaller than the non-selective void volume of adsorbent material passing into that zone, there is a net entrainment of liquid into the zone by the adsorbent which represents a fluid present in non-selective void volume of the adsorbent. It is in most instances the less selectively retained feed components—namely, raffinate component or raffinate materials. The selective pore volume of its adsorbent can absorb portions of raffinate materials from the fluid surrounding the adsorbent since, in certain instances, there is competition between extract material and raffinate material for the adsorptive sites in the selective pore volume of the adsorbent. If large quantity of raffinate material with respect to extract material surrounds the adsorbent, raffinate material can be competitive enough to be adsorbed in measurable quantities by the adsorbent.

If this raffinate material is allowed to remain upon the adsorbent as the adsorbent passes into a desorption zone, then to the extent of raffinate material adsorbed by the adsorbent the extract output stream withdrawn from the desorption zone is contaminated with raffinate materials. Therefore, it is contemplated that in operating the process of this invention that various internal streams contact the adsorbent in its path from the adsorption zone to the desorption zone to substantially eliminate the amount of raffinate material held by the adsorbent when this material passes into the desorption zone.

In adsorptive-separation processes an important factor that is used to determine the ability of a particular adsorbent to separate components of a feed is the selectivity of the adsorbent for one component as compared to another component. The selectivity (B) as used throughout this specification is defined as the ratio of two components of the adsorbed phase over the ratio of the same two components in the unadsorbed phase at equilibrium conditions and is expressed in equation form in Equation 1 below, $$\text{Selectivity} = B_{C/D} = \frac{(\text{vol. percent } C/\text{vol. percent } D)\ A}{(\text{vol. percent } C/\text{vol. percent } D)\ U} \quad (1)$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent, or in other words, there was no net transfer of material occurring between the unadsorbed and adsorbed phases when the selectivity of the two selected components was measured.

As can be seen where the selectivity of two components approaches 1.0 there is no preferential adsorption of one component by the adsorbent. As the absolute value of B becomes greater than unity there is a preferential selectivity by the adsorbent of one component. When comprising the selectivity of component C over component D, a B larger than 1.0 indicates preferential adsorption of component C within the adsorbent while a B less than 1.0 would indicate that component D is preferentially adsorbed leaving an unadsorbed phase richer in component C and an adsorbed phase richer in component D.

In adsorptive-separation processes the separation of aromatics such as xylenes or diethylbenzene can be effected through the use of a crystalline aluminosilicate adsorbent. Common crystalline aluminosilicates which can effectively separate aromatics are the synthetically prepared type X and Y zeolites containing selected cations at the exchangeable cationic sites within the zeolite crystal structure or the naturally occurring faujasites.

Both the natural and synthetic aluminosilicates may be used as adsorbents in the present process. A crystalline zeolitic aluminosilicate encompassed by the present invention for use as an adsorbent includes aluminosilicate cage structures in which the alumina and silica tetrahedra are intimately connected with each other in an open three-dimensional crystalline network. The tetrahedra are cross-linked by the sharing of oxygen atoms. The spaces between the tetrahedra are occupied by water molecules prior to dehydration. Subsequent partial or total dehydration results in crystals interlaced with channels of molecular dimensions. Thus, the crystalline aluminosilicates are often referred to as molecular sieves. In the hydrated form, the crystalline aluminosilicates may be represented by the formula represented in Equation 2, $$M_{2/n}O : Al_2O_3 : wSiO_2 : yH_2O \qquad (2)$$

where M is a cation which balances the electrovalence of the tetrahedra, $n$ represents the valence of the cation, $w$ represents the mols of $Si_2O$, and $y$, the mols of water. The cations may be any one of a number of cations such as for example the alkali metal cations or the alkaline earth cations or other selected cations.

Crystalline aluminosilicates which find use as adsorbents in the process of this invention possess relatively well-defined pore structures. The exact type alumino-silicate is generally referred to by the particular silica-alumina ratio and the pore dimensions of the cage structures. The faujasites are commonly represented as type X and type Y structured aluminosilicates and are defined by their varying silica to alumina ratios.

The zeolite type X can be represented in terms of the mol ratio of oxides as represented in the following Equation 3, $$0.9 \pm 0.2 M_{2/n}O : Al_2O_3 : 2.5 \pm 0.5 SiO_2 : yH_2O \qquad (3)$$

where M represents at least 1 cation having the valence of not more than 3, $n$ represents the valence of M, and $y$ is a value up to about 8 depending upon the identity of M and the degree of hydration of the crystal. Zeolite type X is described in U.S. Pat. No. 2,882,244.

The sodium form type Y zeolite may be represented in the terms of the mol ratio of oxides as represented in the following Equation 4, $$0.9 \pm 0.2 Na_2O : Al_2O_3 : wSiO_2 yH_2O \qquad (4)$$

The exchangeable cationic sites for the type X and Y zeolites, in general, can be defined as represented in Equation 2 above as M. Cationic exchange or base exchange methods are generally known to those familiar with the field of crystalline aluminosilicate production and are generally performed by contacting a zeolite with an aqueous solution of soluble salts of the cations or cation desired to be exchanged on the sieve. The desired degree of cation exchange is allowed to take place before the sieves are removed from the aqueous solution and dried to a desired water content. It is contemplated that in cationic exchange or base exchange methods that the cation exchange may take place using individual solutions of desired cations to be placed on the molecular sieve or can use exchange solutions containing mixtures of the cations which are desired to be exchanged onto the crystalline aluminosilicate zeolite.

The type X and Y zeolite adsorbents containing at their exchangeable cationic sites cations from the group of potassium, rubidium, cesium, barium, copper, silver, lithium, sodium, beryllium, magnesium, calcium, strontium, cadmium, cobalt, nickel, manganese and zinc or combinations thereof are preferred for use in the separation process herein disclosed when separating xylenes or diethylbenzenes. Improved results, however, can be attained by choosing at least one cation from the group of potassium, rubidium, cesium, barium and silver and at least one cation from the group of lithium, sodium, potassium, barium, magnesium, calcium, strontium, beryllium, cadmium, cobalt, nickel, copper, manganese, silver and zinc. The degree of occupation of the above cations on the zeolite's exchangeable cationic sites can be anywhere from about 5% up to 100%.

DESCRIPTION OF THE DRAWING

The attached shows a brief process flow scheme for the process of this invention.

The process of this invention is divided into four basic operational zones characterized as an adsorption zone 1, a purification zone 2, a desorption zone 3 and a buffer zone 4. The four zones as shown in the drawing are stationary beds of solid adsorbent particles but may in other instances consist of a series of one or more individual chambers connected in a serial manner. Each of the individual zones may be a single chamber or a series of beds stacked upon one another in a column making up a zone.

In some instances, the individual zones may contain more than one input and output stream during a period of operations. In some instances the various zones can have input and output which are dormant during a certain period of operations and which do not allow flow through into the zone during the particular operations taking place at the instant at which the process is analyzed.

In the flow scheme for the drawing shown, the over-all liquid flow is in an upward direction while the adsorbent particle flow can be considered to be in a downward direction to help in understanding the processing steps taking place in various zones. During normal fixed-bed countercurrent operations the adsorbent material remains stationary and the individual adsorption, purification, desorption and buffer zones, as defined, are shifted through the adsorbent in a unidirectional manner to allow fluid to flow in a countercurrent direction with respect to solid adsorbent.

As defined above, the adsorption zone 1 is the adsorbent material located between feed input stream (line 7) and the raffinate output stream (line 5) with a raffinate material input stream (line 6) passing into the adsorption zone 1 in a direction upstream, with respect to fluid flow in the adsorption zone 1, from the raffinate output stream 5. The purification zone 2 is located immediately upstream from the adsorption zone and shares the feed input stream 7 as a common boundary with the adsorption zone 1. The purification zone 2 is defined by the feed input stream 7, and the extract output stream (line 9) and contains an extract material input stream (line 8) located upstream, with respect to fluid flow in said purification zone 2, from the feed input stream 7 to that zone. Immediately upstream from the purification zone 2 is the desorption zone 3 which is defined as the adsorbent between the extract output stream 9 and the desorbent input stream (line 10). Immediately upstream from the desorption zone 3 is buffer zone 4 which is defined as the adsorbent located between the desorbent input stream 10 and the raffinate output stream 5.

As can be seen from the drawing, the various zones can share the same input or output line as a common boundary.

Lines 11, 12, 13, 14 and 15 are connecting conduits and connect the various zones to allow a continuous passage of fluid from one zone through and to all the other zones. Line 15 can contain a pump or other fluid displacement means in order to induce flow in the process in a direction passing from line 14 through line 15 and into the buffer zone 4. The material passing out of the adsorption zone 1 via line 14 can pass into line 5 or a portion of it may be diverted via line 15 to be passed eventually into buffer zone 4. Feed stock which passes into the process via line 7 passes through connecting conduit 13 and into the adsorption zone. In some instances a portion of the fluid material which passes out of purification zone 2 via line 13 may pass in admixture with line 7 into adsorption zone 1. Line 12 is a connecting conduit which allows, in some instances, a portion of the fluid material withdrawn from desorption zone 3 via line 12 to bypass line 9 and pass via line 12 into purification zone 2. In a similar manner line 11 connects buffer zone 4 and desorption zone 3 and material leaving buffer zone 4 is allowed to pass out of that zone to contact material passing into the process via desorbent input stream 10 to pass in admixture through line 11 into the desorption zone. This allows a reduction in desorbent requirements from external sources—namely, desorbent input stream 10.

The operations taking place in the various operating zones are as follows: in the adsorption zone the flow of fluid in this zone is from the feed input stream 7 via line 13 towards the raffinate output stream line 5. Essential operations taking place in this zone are the contacting of an adsorbent material with a feed stock which feed stock contains both extract material and raffinate material. The extract material is selectively adsorbed by the adsorbent along with a small portion of raffinate material which clings to the adsorbent. There is generally desorbent present within the selective pore volume and the non-selective void volume of the adsorbent. The adsorbent passes into adsorption zone 1 from its downstream boundary towards that zone's upstream boundary with respect to fluid flow in that zone. The flow of solids occurs into and out of the adsorption zone when the zones are shifted during a portion of the entire cycle of operations.

In instances in which raffinate output material passes via line 15 into the buffer bone 4, the raffinate stream displaces desorbent material from the non-selective void volumes present in the adsorbent particles in the buffer zone. The adsorbent which then passes from the buffer zone into the adsorption zone contains for the most part desorbent material located within the adsorbent particles' selective pore volume. In order to eliminate the last trace of desorbent material present in the adsorbent passing through adsorption zone 1, a raffinate material input stream 6 is utilized. Since the material passing into the adsorption zone via line 6 is required to be of relatively high purity raffinate material, it effectively displaces desorbent from substantially all of the selective pore volume of the adsorbent prior to the adsorbents' contacting of the feed input stream at the upstream portion of the adsorption zone.

The adsorbent, in passing through the adsorption zone 1 towards its upstream boundary adsorbs extract material from the feed stream input stream without having any substantial portions of desorbent material present during the adsorption. As the adsorbent passes out of the adsorption zone it contains extract material and some raffinate material located within the selective pore volume of the adsorbent. The material present in the non-selective void volume of adsorbent is generally raffinate material with small portions of extract material from the feed stock which have not been adsorbed by the adsorbent. This adsorbent then passes into the purification zone 2 passing into that zone via its downstream boundary (the feed input stream 7).

The function of purification zone 2 is to eliminate raffinate material from both the adsorbent's selective pore volume and the adsorbent's non-selective void volume so that the adsorbent leaving the purification zone via its upstream boundary (line 9) contains no measurable amounts of raffinate material which could contaminate the extract product stream.

In the purification zone 2, the extract material input stream 8 passes into the purification zone to help in removing raffinate material from both the adsorbent's selective pore volume and non-selective void volume. The extract material input material is required to be relatively pure in extract material and preferably is derived from the extract output stream after it has been fractionated. The extract material input stream reduces the amount of extract output stream material (which contains both extract and desorbent material) which would normally pass to the purification zone 2 via line 12 and bypassing line 9. To the extent that the extract material input stream 8 replaces the bypassed extract output stream, the former decreases the amount of desorbent which would normally contact the adsorbent in the upstream section of the purification zone. Since at the upstream portion of the purification zone the last traces of extract material are adsorbed from the fluid surrounding the adsorbent, any desorbent which can be prevented from contacting the adsorbent will enhance the extraction operations. It has been found that when minute traces of extract material are desired to be removed from the fluid surrounding the adsorbent, that elimination of desorbent material greatly enhances the ability of the adsorbent to adsorb the last quantities of extract material surrounding the adsorbent particles. The recovery of extract material as compared to the extract material present in the feed stock can easily approach 95% recovery and in some instances when careful control is realized up to 100% extract material recoveries are feasible.

The adsorbent which passes out of purification zone 2 passes into desorption zone 3 via that zone's downstream boundary (the extract output stream 9). The operations taking place in the desorption zone are essentially the removal of extract material from the adsorbent. The removal is effected by passing desorbent input stream into the desorption zone's upstream boundary via lines 10 and 11. The desorbent is capable of displacing extract material from the selective pore volume of the adsorbent. The desorbed extract material passes out of the desorption zone in admixture with desorbent via the extract output stream 9. The adsorbent leaving the desorption zone contains desorbent material located at both the adsorbent's selective pore volume and non-selective void volume. The adsorbent then passes into buffer zone 4.

The essential operation taking place in the buffer zone 4 is the displacement of desorbent material from the adsorbent by portions of the raffinate output stream which pass into buffer zone 4 at its upstream boundary via line 15. The raffinate output stream which passes into the buffer zone is the same material which passes out of zone 1 via line 14 and which by-passes line 5 by going into line 15.

The solid adsorbent entering the buffer zone 4 contains essentially all desorbent material adsorbed by the selective pore volume and present in the non-selective void volume. The solid adsorbent enters the buffer zone from its downstream boundary (the desorbent material input stream, line 10) and leaves the buffer zone at its upstream boundary (the raffinate output stream, line 5). The solid adsorbent leaving the buffer zone contains essentially desorbent material in its selective pore volume with raffinate material present in the adsorbent's non-selective void volume. The raffinate material passed into the buffer zone displaces desorbent material out of the buffer zone and into the desorption zone allowing a savings in the amount of desorbent needed from external sources (the desorbent input stream, line 10). The buffer zone also functions to prevent raffinate material from contaminating the extract material withdrawn from the extract output stream by providing enough adsorbent volume to physically prevent a raffinate material breakthrough from occurring allowing a raffinate to pass into the desorption zone.

The input and output lines 5, 6, 7, 8, 9 and 10 during normal operations carry the respective stream materials as described previously. In order to allow a continuous operation, it is necessary that the individual input and output streams each be shifted in the same direction and in most instances at the same time. By shifting the input and output streams throughout the bed of adsorbent together with the requirement that the terminal zones (adsorption zone 1 and buffer zone 4) have a connecting conduit, it is possible to continuously effect the individual operations taking place in the various zones. When the zones described above are being shifted by incremental amounts through the stationary adsorbent material the adsorbent contacts in the following order, the adsorption zone, the purification zone, the desorption zone and the buffer zone respectively. Reference can be made to U.S. Pat. 2,985,589, having as its inventor the same inventor herein in which a general description of fixed bed simulated moving bed and countercurrent operations take place.

The various input and output streams can pass into the adsorbent column by the use of either a manifold arrangement or a rotary disc valve in which given input streams and output streams are shifted in a predictable manner through the various input and output conduits connecting the various zones. In many instances, one operational zone will contain a much larger quantity of adsorbent than some other operational zone. For instance, in some operations the buffer zone can contain a minor amount of adsorbent as compared to the adsorbent required for the adsorption and purification zones. It can also be seen that in instances in which desorbent is used which can easily desorb extract material from the adsorbent that a relatively small amount of adsorbent will be needed in a desorption zone as compared to the adsorbent needed in the buffer zone or adsorption zone or purification zone or all of them. Since it is not required that the adsorbent be located in a single column, the use of multichambers or a series of columns is not without the scope of the invention.

It is not necessary that all of the input or output streams be simultaneously used, and in fact, in many instances some of the streams can be shut off while others effect an input or output of material. The apparatus which can be utilized to effect process of this invention can also contain many series of individual beds being connected in a serially manner by connecting conduits and having placed upon those connecting conduits input or output taps to which the various input or output streams described herein can be attached and alternately and periodically shifted throughout the process to effect continuous operation. In some instances, the connecting conduits can be connected to transfer taps which during the normal operations do not function as a conduit through which material passes into or out of the process.

It is contemplated that the extract output stream and raffinate output stream can pass into different separation means so that desorbent material can be separated from extract material and raffinate material which is present in the above streams. Separating means which can be used to separate the extract output stream and raffinate output stream include various types of fractionating columns, solvent extraction means or adsorptive separation means. It is also contemplated that the raffinate material input stream and the extract material input stream can be dirived from a portion of the raffinate output stream or extract material output stream which have passed through the separation means in order to form relatively pure streams of raffinate and extract material for the raffinate material input stream and extract material input stream.

The extract material input stream is preferably located closer ot the upstream boundary of the purification zone (extract output stream line 9) as compared to its downstream boundary (feed input stream line 7). In some instances the extract material input stream can be located near the same point along conduit 12 that the extract output stream is located. The extract material input stream 8 is utilized to reduce the amount of material bypassing line 9 via line 12.

The raffinate material input stream 6 can be located anywhere along the adsorbent present within the adsorption zone but is preferably located near its downstream boundary (the raffinate output stream line 5). The adsorbent utilized is generally a ground up zeolitic particle having an optimum dimension somewhere between about 20 to 40 mesh particle size. The size of the units which can be utilized in the process of this invention can vary anywhere from those of pilot scale to those of commercial design and can range in flow rates from as little as a few cc. an hour up to many thousands of gallons per hour.

EXAMPLES

In testing various adsorbents the selectivity ($B_{C/D}$) as defined previously was determined using apparatus and procedures as described below. The apparatus used to measure the selectivity of a particular adsorbent consisted of a chamber of approximately 40 cc. volume having inlet and outlet ports at opposite ends of the chamber. The chamber was contained within a temperature controlled heating means and in addition pressure control equipment was used to operate the chamber at a constant predetermined pressure. Attached to the outlet line connected to the outlet of the chamber there was chromatographic analysis equipment which was used to analyze the effluent stream leaving the adsorbent chamber.

The following general procedures were used to determine the B for various adsorbents tested in the chamber. A feed mixture having a known composition was passed through the adsorbent chamber at a regulated pressure and temperature until the effluent composition flowing from the adsorbent chamber remained at a constant composition indicating that there was no net transfer between the adsorbed phase within the adsorbent and the unadsorbed or external phase surrounding the sorbent particles. A second mixture containing a hydrocarbon which was able to desorb the previously adsorbed component of the feed from the adsorbent was then passed through the adsorbent chamber. The chromatographic analysis equipment was used to monitor the unadsorbed or external phase and the material desorbed from within the adsorbent. Knowing the compositions of these two streams the B for various components present in the feed stream could be determined.

The feed streams which were used to illustrate the process of this invention in the aforementioned testing apparatus consisted of equal quantities (8⅓ vol. percent each) of ethylbenzene, para-xylene and meta-xylene mixed with 2,2,4 - trimethylpentane rendering a feed mixture containing 75 vol. percent paraffinic material and 25 vol. percent $C_8$ aromatic isomer material. The $C_8$ aromatic isomers were diluted in the paraffin material to facilitate ease of analyzing the adsorbed and unadsorbed phases for B determination. Ortho-xylene was excluded, since its presence would have complicated the analytical procedures, although previous experiences indicated that the ortho-xylene isomer behaved substantially the same as the meta-xylene isomer. The desorbent material consisted of 25 vol. percent toluene, 74 vol. percent 2,2,4 - trimethylpentane and 1 vol. percent neohexane which was used as a tracer to determine desorbent break-through in the effluent stream leaving the adsorbent chamber.

The adsorbents used were originally the sodium type X or type Y zeolites which contained cations as is indicated by their individual description. The adsorbents indicated as containing a single cation were essentially totally ion exchanged and generally contained less than about 2 wt. percent residual sodium based on volatile free adsorbent—that is less than 2 wt. percent residual sodium based on the adsorbent after being subjected to 900° C. calcination temperatures to drive off volatile material. The adsorbents which contained two different cations were also essentially totally ion exchanged and contained the two indicated cations.

Example I

In this example, type Y zeolites are used. The zeolite was essentially totally ion exchanged with the indicated cation and was tested for para-xylene/ethylbenzene selectivity ($B_{p-x/EB}$) and for para-xylene/meta-xylene selectivity ($B_{p-x/M-x}$) as previously described. The results are indicated in Table I below.

TABLE I

|  | Selectivity | |
| --- | --- | --- |
|  | $B_{p-/M-x}$ | $B_{p-/EB}$ |
| Sieve description: | | |
| Group I-A metals: | | |
| Type Y, lithium exchanged | 0.72 | 1.52 |
| Type Y, sodium exchanged | 0.75 | 1.32 |
| Type Y, potassium exchanged | 1.83 | 1.16 |
| Type Y, rubidium exchanged | 1.51 | 0.96 |
| Type Y, cesium exchanged | 1.50 | 0.80 |
| Type X, sodium exchanged | 1.02 | 1.15 |
| Group II-A metals: | | |
| Type Y, beryllium exchanged | 0.91 | 1.08 |
| Type Y, magnesium exchanged | 0.59 | 1.67 |
| Type Y, calcium exchanged | 0.35 | 1.17 |
| Type Y, strontium exchanged | 0.44 | 1.40 |
| Type Y, barium exchanged | 1.27 | 1.85 |
| Others: | | |
| Type Y, nickel exchanged | 0.70 | 1.27 |
| Type Y, copper exchanged | 0.62 | 1.46 |
| Type Y, silver exchanged | 1.02 | 1.19 |
| Type Y, manganese exchanged | 0.66 | 1.25 |
| Type Y, cadmium exchanged | 0.61 | 1.19 |

As can be seen from the data above, the only single cation exchanged adsorbents which could be used for para-xylene separation from streams containing meta-xylene and ethylbenzene are potassium, barium, sodium and silver exchanged zeolite adsorbents.

Example II

In this example the zeolite was essentially totally ion exchanged with an aqueous mixture containing the two cations desired to be placed on the zeolite adsorbent. The adsorbents which contained both Group I-A and Group II-A cations were ion exchanged in a manner which resulted in a mol ratio of the Group II-A metal over the Group I-A metal of about 3.1 while the adsorbents containing the Group I-A metals combination were exchanged in a manner which resulted in a mol ratio of the two Group I-A metals of about 1:1. The adsorbents were tested in accordance with the previously described procedures and the results of the test are reported in Table II below.

TABLE II

|  | Selectivity | |
| --- | --- | --- |
|  | $B_{p-/M-x}$ | $B_{p-/EB}$ |
| Sieve description: | | |
| Group I-A+II-A metals: | | |
| Type Y, K+Ba exchanged | 3.76 | 2.10 |
| Type Y, K+Be exchanged | 2.11 | 1.44 |
| Type Y, K+Mg exchanged | 2.25 | 1.41 |
| Type Y, Rb+Ba exchanged | 2.05 | 1.41 |
| Type Y, Cs+Ba exchanged | 1.57 | 1.30 |
| Type X, K+Ba exchanged | 2.49 | 2.03 |
| Group I-A metals: | | |
| Type Y, K+Rb exchanged | 1.80 | 1.06 |
| Type Y, K+Cs exchanged | 1.79 | 1.03 |

Example III

In this illustrative example 24 beds of adsorbent are utilized to effect a separation. The adsorbent is one of the preferred zeolites and is distributed equally among the 24 beds. The beds are serially connected with bed 1 and bed 24 being the terminal beds. The fluid flow through the beds is from bed 24 through the intermediate 22 beds and to bed 1. Therefore bed 23 is downstream from bed 24, bed 22 is downstream from bed 23, etc.

Each bed is connected to the bed immediately upstream and downstream of it by a connecting conduit which contains an inlet through which an input or output stream may pass. The terminal beds 1 and 24 are connected by connecting conduit which contains a pump to induce flow in a given direction through the beds. As an alternate mode of operations, check valves may be placed in the connecting conduits and two of the input or output streams flow rates may be regulated to induce an overall single direction of flow through the beds. In this manner the pump can be eliminated from the connecting conduit.

There are six input or output streams located as follows in Table III below:

TABLE III

| Bed No.: | Stream description [1] |
| --- | --- |
| 1 | Raffinate output. |
| 2 | Static. |
| 3 | Raffinate material input. |
| 4 | Static. |
| 5 | Do. |
| 6 | Do. |
| 7 | Do. |
| 8 | Feed input. |
| 9 | Static. |
| 10 | Do. |
| 11 | Do. |
| 12 | Do. |
| 13 | Extract material input. |
| 14 | Static. |
| 15 | Extract output. |
| 16 | Static. |
| 17 | Do. |
| 18 | Do. |
| 19 | Do. |
| 20 | Do. |
| 21 | Do. |
| 22 | Desorbent input. |
| 23 | Static. |
| 24 | Do. |

[1] All input or output streams are downstream of the bed associated with them.

Since there are only six active input or output streams being utilized during a given instant of operations, the remaining connecting conduits which connect the beds and contain inlets are not active. During the normal cycle of operations each of the respective input and output streams is shifted in a downstream direction to the next bed's connecting conduit. In many instances the shifting will cause an input or output stream to advance to a connecting conduit which previously was stagnant since no input or output stream was previously passing through it.

The shifting of the input and output streams causes the individual operational zones to shift since the zones are defined by the locations of the input and output streams. In order for a particular input or output stream to end up at its starting location, it must be shifted 24 times since each shift is one bed in a downstream direction. An entire cycle of operations is defined as a 24 shift sequence and can be any length of time desired for efficient operations. The cycle time is generally dependent on the quantity of adsorbent present, the feed rate into the process and the selectivity of the adsorbent for the extract material.

In order to maintain some degree of control over the fluid flow in the process and to allow the various input and output streams to be shifted without upsetting the flow pattern in the various zones, it is preferred that the flow rates into and out of the process be regulated both during the time period when the input and output streams remain at given positions.

The continuous operations are maintained by periodically shifting the input and output streams, and when any of those streams is present at the downstream boundary of terminal zone 1, it can be shifted to the next downstream bed which is bed 24. The connecting conduit which connects the terminal beds 1 and 24 offers a path through which fluid can flow during shifting from one terminal bed to the other.

The above examples are offered as illustrations of various embodiments of the present invention and should not be utilized to limit the scope of the claims attached.

EMBODIMENTS

A broad embodiment of this invention resides in an improved process for the separation of aromatic hydrocarbon utilizing a fixed-bed countercurrent flow scheme wherein an improvement resides maintaining a buffer zone of adsorbent immediately upstream from a desorption zone, and passing at least a portion of a raffinate output stream into the buffer zone to effect desorption of desorbent materials from the adsorbent present within the buffer zone and maintaining enough adsorbent, in said buffer zone to prevent the contamination of an extract product material by the raffinate output stream passed into the buffer zone.

I claim as my invention:

1. In a process for the separation of an aromatic feed stream into an extract material and a raffinate material through the use of adsorbent particles having selective adsorption properties for said extract as compared to said raffinate, said process comprises:
   (i) maintaining fluid flow through a column of an adsorbent in a single direction, which column contains at least four zones having separate operational functions occurring therein and being serially interconnected with the terminal zones of said column connected to provide a continuous connection of said zones;
   (ii) maintaining an adsorption zone in said column, said zone defined by the adsorbent located between a feed input stream at an upstream boundary of said zone and a raffinate output stream at a downstream boundary of said zone;
   (iii) maintaining a purification zone immediately upstream from said adsorption zone, said purification zone defined by the adsorbent located between an extract output stream at an upstream boundary of said purification zone and said feed input stream at a downstream boundary of said purification zone, said purification zone having an extract material input stream located upstream from said feed input stream;
   (iv) maintaining a desorption zone immediately upstream from said purification zone, said desorption zone defined by the adsorbent located between a desorbent input stream at an upstream boundary of said zone and said extract output stream at a downstream boundary of said zone;
   (v) maintaining a buffer zone immediately upstream from said desorption zone, said buffer zone defined as the adsorbent located between the desorbent input stream at a downstream boundary of said buffer zone and a raffinate output stream at an upstream boundary of said buffer zone;
   (vi) passing a feed stream comprising extract and raffinate material into said adsorption zone at adsorption conditions to effect the selective adsorption of said extract material by said adsorbent in said adsorption zone, withdrawing a raffinate stream from said adsorption zone;
   (vii) passing a desorbent stream into said desorption zone at desorption conditions to effect the displacement of extract material from the adsorbent in said desorption zone, withdrawing an extract stream comprising extract material and desorbent material from said desorption zone, said adsorbent having adsorbed said extract material during a previous contacting of said adsorbent with the feed stream in an adsorption zone;
   (viii) passing an extract material input stream into said purification zone at purification conditions to effect the desorption of raffinate material from the adsorbent and the displacement of raffinate from the interstitial void spaces between adsorbent particles, said adsorbent having previously contacted a feed stream in an adsorption zone;
   (ix) passing at least a portion of the raffinate output stream passing out of the adsorption zone into the buffer zone to effect desorption of desorbent from the adsorbent and displacement of desorbent material from the interstitial void spaces between adsorbent particles, said adsorbent having previously contacted desorbent material in said adsorption zone; and,
   (x) periodically advancing through said column of adsorbent particles in a downstream direction, with respect to fluid flow in said adsorption zone, said adsorption, purification, buffer and desorption zones to effect a continuous separation of the feed stream into extract and raffinate streams; wherein an improvement in said process comprises: passing a raffinate material input stream into said adsorption zone to effect the displacement from said adsorbent in said zone of desorbent absorbed by said adsorbent during a previous contacting of said adsorbent with desorbent in a desorption zone.

2. Claim 1 further characterized in that said adsorbent particles are selected from a crystalline aluminosilicate selected from the group consisting of the synthetically prepared type X and type Y zeolites.

3. Claim 2 further characterized in that adsorbent contains cations selected from the group consisting of barium and potassium.

4. Claim 2 further characterized in that said feed stream contains aromatic type hydrocarbons selected from the group consisting of $C_8$ aromatics and diethylbenzenes.

5. Claim 4 further characterized in that said feed stream contains para-xylene and at least one $C_8$ aromatic selected from the group consisting of ortho-xylene, meta-xylene and ethylbenzene.

6. Claim 5 further characterized in that para-xylene is an extract material which is preferentially adsorbed by said adsorbent particles.

7. Claim 4 further characterized in that said feed stream contains diethylbenzene isomers.

8. Claim 7 further characterized in that para-diethylbenzene is an extract material.

9. Claim 1 further characterized in that said desorbent stream comprises a hydrocarbon which is readily separable from the feed stream by fractionation means.

10. Claim 1 further characterized in that said extract material stream is derived from an extract output stream which is withdrawn from said process from said desorption zone.

11. Claim 1 further characterized in that said raffinate material input stream is derived from said raffinate output stream.

12. Claim 11 further characterized in that said raffinate material input stream contains essentially pure raffinate material.

13. Claim 2 further characterized in that said raffinate material input stream is derived from said raffinate output stream.

14. Claim 13 further characterized in that said raffinate material input stream contains essentially pure raffinate material.

15. Claim 4 further characterized in that said raffinate material input stream is derived from said raffinate output stream.

16. Claim 15 further characterized in that said raffinate material input stream contains essentially pure raffinate material.

References Cited

UNITED STATES PATENTS

| | | | |
|---|---|---|---|
| 3,310,486 | 3/1967 | Broughton et al. | 260—674 |
| 3,114,782 | 12/1963 | Fleck et al. | 260—674 |
| 3,558,730 | 1/1971 | Neuzil | 260—674 |
| 2,646,451 | 7/1951 | Rommel | 260—674 |
| 3,476,822 | 11/1969 | Robertson et al. | 260—674 |

DELBERT E. GANTZ, Primary Examiner

C. E. SPRESSER, Jr., Assistant Examiner

U.S. Cl. X.R.

208—310